United States Patent
Onishi

(10) Patent No.: US 11,958,562 B2
(45) Date of Patent: Apr. 16, 2024

(54) OPEN-CABIN VEHICLE AND PORTABLE TERMINAL

(71) Applicant: YAMAHA HATSUDOKI KABUSHIKI KAISHA, Iwata (JP)

(72) Inventor: Kotaro Onishi, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 190 days.

(21) Appl. No.: 16/591,112

(22) Filed: Oct. 2, 2019

(65) Prior Publication Data

US 2020/0035048 A1 Jan. 30, 2020

Related U.S. Application Data

(63) Continuation of application No. PCT/JP2018/014217, filed on Apr. 3, 2018.

(30) Foreign Application Priority Data

Apr. 13, 2017 (JP) .................................. 2017-079864

(51) Int. Cl.
*B62J 50/20* (2020.01)
*B60R 25/02* (2013.01)
(Continued)

(52) U.S. Cl.
CPC ............... *B62J 50/20* (2020.02); *B60R 25/02* (2013.01); *B60R 25/04* (2013.01); *B60R 25/241* (2013.01);
(Continued)

(58) Field of Classification Search
CPC ...... G07C 9/00309; G07C 2009/00769; G07C 2009/00388; G07C 2009/00793;
(Continued)

(56) References Cited

U.S. PATENT DOCUMENTS

| 6,075,454 A * | 6/2000 | Yamasaki .......... G07C 9/00309 |
| | | 307/10.5 |
| 7,224,980 B2 * | 5/2007 | Hara ....................... B60R 25/24 |
| | | 340/10.1 |

(Continued)

FOREIGN PATENT DOCUMENTS

| DE | 10125064 A1 | 11/2002 |
| EP | 1184236 A2 | 3/2002 |

(Continued)

OTHER PUBLICATIONS

Taiwan Patent Office, Office Action, Patent Application Serial No. TW107112537, dated Jan. 18, 2019.

*Primary Examiner* — Nam V Nguyen
(74) *Attorney, Agent, or Firm* — RABIN & BERDO, P.C.

(57) ABSTRACT

A drive activation control unit in a control apparatus of a motorcycle controls a drive apparatus. An identification signal transmission unit intermittently transmits an identification signal without any operation by an operator who carries a portable terminal. A response signal reception unit receives a response signal transmitted from the portable terminal in response to the identification signal. In response to reception of the response signal, a request signal transmission unit makes a request of the portable terminal for key information. The key-information signal reception unit receives a key information signal including the key information. A drive-activation permission determination unit determines whether or not to permit activation of a drive control unit based on the key information. When the drive-activation permission determination unit permits activation of a drive control unit, the drive activation control unit activates the drive control unit without any operation by an operator who carries the portable terminal.

6 Claims, 8 Drawing Sheets

(51) Int. Cl.
*B60R 25/04* (2013.01)
*B60R 25/24* (2013.01)
*G07C 9/00* (2020.01)

(52) U.S. Cl.
CPC .......... *B60R 25/245* (2013.01); *B60R 25/246* (2013.01); *G07C 9/00309* (2013.01); *G07C 2009/00769* (2013.01)

(58) Field of Classification Search
CPC ....... B60R 25/02; B60R 25/04; B60R 25/241; B60R 25/245; B60R 25/246; B60R 25/045; B60R 25/24; B62H 5/08; B62J 99/00; E05B 49/00; E05B 83/00
USPC ......... 340/5.72, 10.34, 10.4; 455/69, 70, 78, 455/92, 99
See application file for complete search history.

(56) References Cited

U.S. PATENT DOCUMENTS

| | | | | |
|---|---|---|---|---|
| 7,751,957 | B2* | 7/2010 | Nagaoka | B60R 25/24 455/92 |
| 7,834,745 | B2* | 11/2010 | Ramirez | B60R 25/104 340/427 |
| 8,155,827 | B2* | 4/2012 | Nakajima | B60R 25/24 340/426.16 |
| 9,310,808 | B2* | 4/2016 | Shankwitz | G05D 1/0891 |
| 9,412,274 | B2* | 8/2016 | Lickfelt | G08B 3/10 |
| 9,682,683 | B2* | 6/2017 | Williams | H04W 4/80 |
| 9,919,680 | B2* | 3/2018 | Miyazawa | B60R 25/24 |
| 9,932,043 | B2* | 4/2018 | Chaston | B60R 25/24 |
| 9,940,763 | B2* | 4/2018 | Nagata | G07C 9/00309 |
| 9,963,107 | B2* | 5/2018 | Murar | B60Q 1/32 |
| 10,129,388 | B1* | 11/2018 | Elliott | H04W 4/40 |
| 10,139,481 | B2* | 11/2018 | Murakami | B60R 25/245 |
| 10,217,300 | B2* | 2/2019 | Ziller | G07C 9/00309 |
| 10,431,027 | B2* | 10/2019 | Ishihara | H04W 12/06 |
| 2002/0025823 | A1 | 2/2002 | Hara | |
| 2006/0163947 | A1 | 7/2006 | Onishi et al. | |
| 2008/0224824 | A1* | 9/2008 | Yoshizawa | B60R 25/24 340/5.61 |
| 2010/0075656 | A1 | 3/2010 | Howarter et al. | |
| 2016/0063860 | A1 | 3/2016 | Lickfelt et al. | |
| 2016/0125675 | A1 | 5/2016 | Ziller | |
| 2016/0277601 | A1* | 9/2016 | Seymour | H04N 7/181 |
| 2018/0370485 | A1* | 12/2018 | Takatsuka | B60R 25/32 |

FOREIGN PATENT DOCUMENTS

| | | |
|---|---|---|
| EP | 1690761 A2 | 8/2006 |
| EP | 1970266 A1 | 9/2008 |
| JP | 2002-077972 A | 3/2002 |
| JP | 2004-116176 A | 4/2004 |
| JP | 2006-199168 A | 8/2006 |
| JP | 2006-306161 A | 11/2006 |
| JP | 2008310765 A | 12/2008 |
| JP | 2009002123 A | 1/2009 |
| JP | 2011-020634 A | 2/2011 |
| JP | 2011201358 A | 10/2011 |
| JP | 2013040474 A | 2/2013 |
| JP | 2015-101251 A | 6/2015 |
| JP | 2015104975 A | 6/2015 |
| JP | 2015183482 A | 10/2015 |
| JP | 2016084063 A | 5/2016 |
| JP | 2016160669 A | 9/2016 |
| JP | 2016211329 A | 12/2016 |
| JP | 2016215845 A | 12/2016 |
| KR | 1020090050742 A | 5/2009 |
| WO | 2015/162444 A1 | 10/2015 |

* cited by examiner

OPEN-CABIN VEHICLE AND PORTABLE TERMINAL

CROSS-REFERENCE TO RELATED APPLICATIONS

This application is a continuation of International Application PCT/JP2018/014217 filed on Apr. 3, 2018, which claims priority from Japanese Patent Application No. 2017-079864 filed on Apr. 13, 2017. The contents of each of the identified applications are entirely incorporated herein by reference.

BACKGROUND

Technical Field

The present teaching relates to an open-cabin vehicle whose riding area is not an enclosed space, and a portable terminal which is communicable with the open-cabin vehicle.

Background Art

A plurality of straddled vehicles equipped with a smart key have been proposed.

An electronic key system for a vehicle disclosed in Japanese Patent Application Publication No. 2006-306161 (Patent Literature 1) includes an in-vehicle apparatus and a portable device which receives a request signal transmitted from the in-vehicle apparatus and transmits a response signal. The portable device includes a plurality of reception circuits having tuning circuits having different reception sensitivities to each other, which receives the request signal, a reception sensitivity switching switch, and reception-sensitivity switching control means for switching the reception sensitivity by switching the reception circuit to be operated based on an operation of the reception sensitivity switching switch.

An electronic key system for a vehicle disclosed in Japanese Patent Application Publication No. 2004-116176 (Patent Literature 2) includes a control apparatus equipped on a real vehicle, and a portable type transceiver carried by a user. The real vehicle includes a locking apparatus which locks the real vehicle to be inoperable until a lock release instruction is provided. Among operation switches which are plurality of switches installed in a vehicle and to be used for engine initiation of the real vehicle, security during travelling, and stopping of the real vehicle, one operation switch which is preset separately for each user is used as an activation switch. The control apparatus includes means for outputting a request signal to the portable-type transceiver based on an ON operation of the activation switch, means for detecting a response signal based on the request signal from the portable-type transceiver, means for outputting lock releasing instruction to the locking apparatus when a response signal is verified and the response signal is determined to be a request from a valid user, means for stopping power supply at least to circuits of a system for performing communication out of the control apparatus when the real vehicle is not activated for a predetermined period of time, and means for performing power supply to the circuits system based on an ON operation of the activation switch.

The electronic key systems disclosed in Patent Literatures 1 and 2 are excellent in convenience. Further, improved techniques of these electronic key systems are proposed in Japanese Patent Application Publication No. 2015-101251 (Patent Literature 3). The control apparatus for a motorcycle disclosed in Patent Literature 3 includes: an authentication unit for authenticating that the user of the motorcycle is a valid user based on communication with the portable device carried by the user, a grip sensor signal input unit for accepting an input of the grip sensor signal from the grip sensor for detecting approach or contact of the user to the grip of the handle of the motorcycle, a seat sensor signal input unit for accepting an input of the seat sensor signal from the seat sensor for detecting sitting on the seat of the motorcycle, an engine initiation control unit for controlling the initiation of engine of the motorcycle, and a handle locking/unlocking control unit for controlling the locking/unlocking of the handle. The authentication unit transmits a first request signal to the portable device based on the grip sensor signal from the grip sensor signal input unit, and when the handle locking/unlocking control unit controls the handle to be in an unlocked state, transmits a second request signal to the portable device based on the seat sensor signal from the seat sensor signal input unit. When the authentication unit receives a valid first response signal to the first request signal from the portable device, the handle locking/unlocking control unit unlocks the handle. When the authentication unit receives a valid second response signal to the second request signal from the portable device, the engine initiation control unit initiates the engine.

In this way, in the control apparatus for a motorized two-wheel vehicle of Patent Literature 3, the action of the rider to hold a grip of the motorcycle is used as a trigger of starting authentication action. That is, gripping operation of the rider is used as a trigger for starting authentication action. For that reason, convenience is further improved.

CITATION LIST

Patent Literature

Patent Literature 1: Japanese Patent Application Publication No. 2006-306161
Patent Literature 2: Japanese Patent Application Publication No. 2004-116176
Patent Literature 3: Japanese Patent Application Publication No. 2015-101251

By the way, one problem peculiar to an open-cabin vehicle represented by a straddled vehicle is power consumption capacity. Since mounting space for various equipment is limited in an open-cabin vehicle represented by a straddled vehicle, the battery capacity to be mounted is restricted. Therefore, when an authentication system is realized in an open-cabin vehicle represented by a straddled vehicle, it is preferable that power consumption can be suppressed or reduced.

Further, an open-cabin vehicle represented by a straddled vehicle does not have a door. In the case of an automobile having a door, a driver performs various operations such as opening the door and fastening a seat belt after having been seated, before bringing the automobile into a controllable state (a state of being ready to initiate a drive apparatus such as an engine). However, in the case of an open-cabin vehicle, the kinds of operation of the rider will be limited since there is no door. For that reason, in Patent Literature 3, a request signal for authentication is transmitted not based on operation on a request switch, but based on operation of the rider on the vehicle to hold a grip necessary for riding.

In recent years, it is required to further improve convenience while maintaining a level of power consumption which allows realization of an open-cabin vehicle represented by a straddled vehicle.

SUMMARY OF THE INVENTION

It is an object of the present teaching to provide an open-cabin vehicle which can suppress or reduce power consumption and further improve convenience.

In Patent Literature 3, as described above, an authentication technique focusing on an operation of rider peculiar to a straddled vehicle, such as holding a grip, is proposed. Accordingly, the present inventors studied an authentication technique focusing on another operation of rider peculiar to an open-cabin vehicle.

In a general four-wheeled vehicle, until the automobile is brought into a drivable state, a driver performs various operations, such as an operation of opening the door, an operation of fastening the seat belt after having been seated, and the like. On the other hand, in an open-cabin vehicle, a rider can get on the open-cabin vehicle without opening the door. Therefore, the kinds of rider operation peculiar to an open-cabin vehicle are limited.

Since, as described above, the kinds of rider operation peculiar to an open-cabin vehicle are limited, the present inventors changed their mindset to focus on actions of the rider until the rider gets on the open-cabin vehicle, and not on the rider's operation on the open-cabin vehicle such as holding a grip. Then, the present inventors studied in detail actions of a rider until the rider gets on the open-cabin vehicle. As a result of that the present inventors have focused on the fact that an action to approach the open-cabin vehicle by a rider is necessarily performed. If authentication is performed only by a rider approaching the open-cabin vehicle without performing any operation, and the drive control unit for controlling the drive apparatus of the open-cabin vehicle is activated, convenience will be further improved.

However, to detect an action of the rider to approach the open-cabin vehicle, the open-cabin vehicle must detect at least intermittently that the rider is approaching. In this case, since the open-cabin vehicle consumes power for detection, it is considered that the power consumption will not fit into a range which allows realization of an open-cabin vehicle.

However, the present inventors studied an authentication system venturing to focus on the above described action which is considered to be difficult to adopt.

By the way, the open-cabin vehicle has no door as described above. Therefore if, when the distance from the open-cabin vehicle to the rider is large, the open-cabin vehicle is brought into a controllable state (a state in which the drive apparatus such as an engine is ready to be initiated) by the portable terminal of the rider, a third party who is located closer to the open-cabin vehicle than the rider may arrive at and get on the open-cabin vehicle earlier, before the rider arrives at the open-cabin vehicle. Therefore, a range in which the portable terminal can respond to a transmission signal from a transmission device is preferably narrower. It was considered that when the responsive range is narrow, to accurately detect the approaching action of a rider, transmitting frequency of transmission signal from the transmission device needs to be increased.

Accordingly, the present inventors studied in detail what level of frequency is preferable for transmitting a transmission signal. Before the rider starts driving the open-cabin vehicle, there are actions that are typically performed although the order thereof is not limited. Those include an action of sitting on the seat of the open-cabin vehicle, an action of lifting the stand, and the like. These typical actions are performed after the rider arrives at the open-cabin vehicle. That is, it is not necessarily needed to bring the open-cabin vehicle into a controllable state (a state of being ready to initiate the drive apparatus) right after the rider arrives at the open-cabin vehicle. This is because the rider needs time to perform the above described typical actions after arriving at the open-cabin vehicle. The present inventors have first found that considering the time needed for those typical actions, even if the frequency of transmitting a transmission signal is low, it is possible to satisfactorily detect the approaching action of a rider.

When the open-cabin vehicle transmits a transmission signal, even if approaching action of a rider is detected with a reduced transmitting frequency of the transmission signal, it satisfactorily functions as an authentication system. Further, since the responsive range of transmission signal is narrowed, the output power for transmitting a transmission signal can be lowered. Since the output power of transmission signal can be suppressed or reduced, it is possible to significantly suppress or reduce the power consumption for transmitting a transmission signal at the open-cabin vehicle.

As described so far, as a result of the study by the present inventors, they have first found that by considering countermeasures against power consumption and third parties other than a rider, it would be possible to adopt a system for performing authentication by intermittently transmitting a transmission signal from the open-cabin vehicle without any operation by the operator represented by a rider on the open-cabin vehicle or the portable terminal, which had been considered to be difficult to adopt.

The open-cabin vehicle according to the present teaching, which has been completed based on the above described findings, includes the following configurations.

(1) According to one aspect, the open-cabin vehicle of the present teaching includes a drive apparatus, a control apparatus, and a power supply apparatus. The power supply apparatus can supply power to the control apparatus. The control apparatus controls the drive apparatus. The control apparatus includes a drive control unit, an identification signal transmission unit, a response signal reception unit, a request signal transmission unit, a key-information signal reception unit, a drive-activation permission determination unit, and a drive activation control unit. The drive control unit controls the drive apparatus. The identification signal transmission unit intermittently transmits an identification signal including identification information which is identifiable information without any operation by an operator, who carries the portable terminal including key information, on the open-cabin vehicle or the portable terminal. The response signal reception unit receives a response signal transmitted from the portable terminal without any operation by the operator, who carries the portable terminal including key information, on the open-cabin vehicle or the portable terminal in response to intermittently transmitted identification signal. The request signal transmission unit transmits, in response to reception of a response signal, a request signal for requesting the portable terminal to transmit a key-information signal including key information without any operation by the operator, who carries the portable terminal including key information, on the open-cabin vehicle or the portable terminal. The key-information signal reception unit receives a key information signal including key information transmitted from the portable terminal without any operation by the operator, who carries the portable terminal including key information, on the open-cabin vehicle or the portable terminal in response to a request signal by the request signal transmission unit. The drive-activation permission determination unit determines whether or not to permit activation of the drive control unit based on the key information signal received by the key-information signal reception unit without any operation by the operator, who carries the portable terminal including key information, on the open-cabin vehicle or the portable terminal. The drive activation control unit activates the drive control unit when the drive-activation permission determination unit permits the activation of the drive control unit, without any operation by the operator, who carries the portable terminal including key information, on the open-cabin vehicle or the portable terminal.

In the present description, the open-cabin vehicle is a vehicle whose cabin is not an enclosed space and opened to the outside, and which does not include a door beside a seat. Examples of the open-cabin vehicle include a straddled vehicle and a ROV (Recreational Off highway Vehicle). Examples of the straddled vehicle include motorcycles and All Terrain Vehicles (ATVs). In the present embodiment, as an example of the open-cabin vehicle, a motorcycle will be shown. However, the open-cabin vehicle will not be limited to the motorcycle. The open-cabin vehicle includes vehicles of the above described definition.

Moreover, the phrase "without any operation by an operator who carries the portable terminal on the open-cabin vehicle or the portable terminal" means "without an operator operating an operation button of a physical key (hard key) or a soft key (key reconstructed by means of software) of the portable terminal, or operating a physical key or a soft key of the open-cabin vehicle." The physical key is a key (hard key) with which an ON/OFF state is detected by a switch or button being physically moved. The physical key or soft key of the portable terminal includes for example, a keyboard, a numeric keypad, a power button, a volume button, a home button for returning to the home screen, and the like. The physical key of the open-cabin vehicle is, for example, various operation switches (ignition switch, main switch, accelerator grip, brake lever, turn signal switch, head light high/low selector switch). The functions of the above described operation switches may be replaced by soft keys in some cases.

Examples of the portable terminal include a smart phone, a PDA (Personal Digital Assistant) represented by a portable telephone, a tablet, a smart key, a laptop, and a portable game machine.

(2) According to another aspect, the above described response signal may further include distance information regarding a distance between the portable terminal and the open-cabin vehicle. In this case, the control apparatus may further include a distance determination unit. The distance determination unit determines, based on a response signal including distance information, whether or not the distance between the portable terminal and the open-cabin vehicle is within a specific distance without any operation by the operator, who carries the portable terminal including key information, on the open-cabin vehicle or the portable terminal. When the distance determination unit determines that the distance between the portable terminal and the open-cabin vehicle is within the specific distance based on the distance information, the request signal transmission unit transmits a request signal for requesting the portable terminal to transmit a signal including key information without any operation by the operator, who carries the portable terminal including key information, on the open-cabin vehicle or the portable terminal.

In this case, when the distance between the operator (e.g., a rider) who carries the portable terminal and the open-cabin vehicle becomes within a specific distance, authentication is performed. Therefore, it is made easier to inhibit a third party getting on the open-cabin vehicle before the operator arrives at the open-cabin vehicle.

Moreover, the portable terminal is capable of communication with the open-cabin vehicle in the present teaching, and has the following configuration.

(3) A portable terminal according to the present teaching is capable of communication with the above described open-cabin vehicle whose riding area is not an enclosed space. The portable terminal includes a storage unit for storing key information, a response signal transmission unit, and a key-information signal transmission unit. The response signal transmission unit transmits, in response to the identification signal transmitted intermittently, a response signal without any operation by the operator, who carries the portable terminal including key information, on the open-cabin vehicle or the portable terminal. The key-information signal transmission unit transmits, in response to the request signal by the request signal transmission unit, a key information signal including key information without any operation by the operator, who carries the portable terminal including key information, on the open-cabin vehicle or the portable terminal.

In this case, the operator can bring the drive apparatus represented by an engine or a motor into a controllable state only by taking action to approach the open-cabin vehicle without performing any operation on the open-cabin vehicle or the portable terminal. For that reason, after getting on the open-cabin vehicle, the operator can quickly perform initiation of the drive apparatus, releasing the handle lock, and the like.

(4) According to another aspect, the response signal further includes distance information regarding the distance between the portable terminal and the open-cabin vehicle. The control apparatus of the open-cabin vehicle further includes a distance determination unit. The distance determination unit determines, based on the response signal including the distance information, whether or not the distance between the portable terminal and the open-cabin vehicle is within a specific distance without any operation by the operator, who carries the portable terminal including key information, on the open-cabin vehicle or the portable terminal. When the distance determination unit determines that the distance between the portable terminal and the open-cabin vehicle is within the specific distance based on the distance information, the request signal transmission unit transmits a request signal for requesting the portable terminal to transmit a signal including key information without any operation by the operator, who carries the portable terminal including key information, on the open-cabin vehicle or the portable terminal. The portable terminal further includes a distance information generation unit. The distance information generation unit generates, in response to the reception of the identification signal, distance information regarding the distance between the portable terminal and the open-cabin vehicle. The response signal transmission unit of the portable terminal transmits a response signal including distance information regarding the distance between the portable terminal and the open-cabin vehicle without any operation by the operator, who carries the portable terminal including key information, on the open-cabin vehicle or the portable terminal.

In this case, when the distance between the operator (e.g., a rider) who carries the portable terminal and the open-cabin vehicle becomes within the specific distance, authentication is performed. For that reason, it becomes easier to inhibit a third party from getting on the open-cabin vehicle before the operator arrives at the open-cabin vehicle. Here, the specific distance is a preset distance. The specific distance may be appropriately adjusted by the owner of the portable terminal.

As used herein, the term "and/or" includes any and all combinations of one or more of the associated listed items.

It will be further understood that the terms "including," "comprising" or "having" and variations thereof when used in this specification, specify the presence of stated features, steps, operations, elements, components, and/or their equivalents but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this teaching belongs.

It will be further understood that terms, such as those defined in commonly used dictionaries, should be interpreted as having a meaning that is consistent with their meaning in the context of the relevant art, and the present disclosure and will not be interpreted in an idealized or overly formal sense unless expressly so defined herein.

In describing the teaching, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the teaching and the claims.

In the following description, for purposes of explanation, numerous specific details are set forth in order to provide a thorough understanding of the present teaching. It will be evident, however, to one skilled in the art that the present teaching may be practiced without these specific details. The present disclosure is to be considered as an exemplification of the teaching, and is not intended to limit the teaching to the specific embodiments illustrated by the figures or description below.

DETAILED DESCRIPTION

Hereinafter, an open-cabin vehicle according to the present embodiment and a portable terminal which is capable of communication with the open-cabin vehicle are described.

[General Configuration of Open-Cabin Vehicle]

The term "open-cabin vehicle" as used in the present specification means a vehicle whose cabin is not an enclosed space and is opened to the outside, and which has no door beside a seat. Examples of the open-cabin vehicle include a straddled vehicle, a Recreational Off highway Vehicle (ROV), and the like. Examples of the straddled vehicle include, for example, motorcycles and All Terrain Vehicles (ATVs). In the present embodiment, a motorcycle is shown as one example of the open-cabin vehicle. However, the open-cabin vehicle will not be limited to the motorcycle. The open-cabin vehicle includes vehicles of the above described definition.

Figure 1:
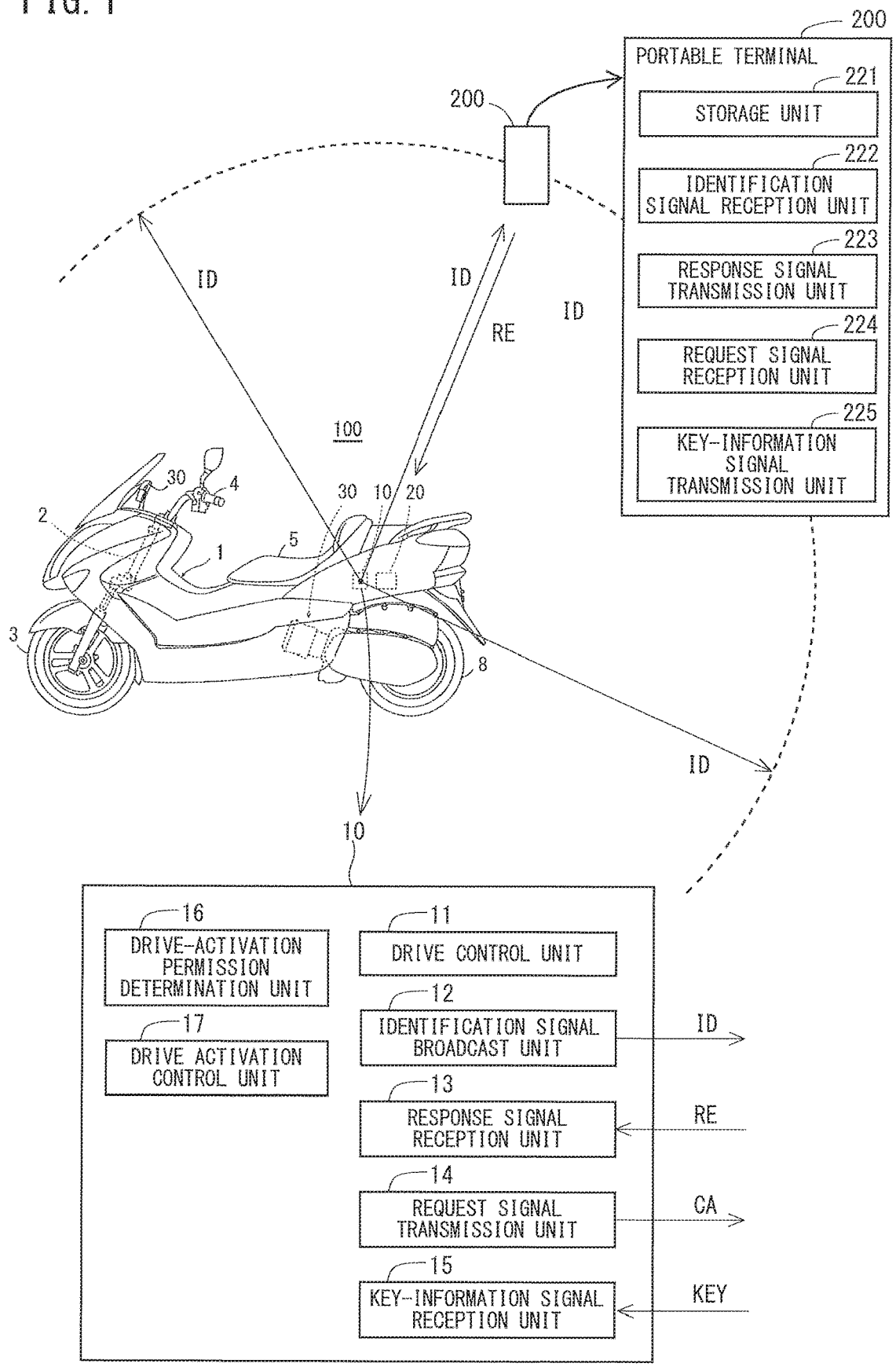
FIG. 1 is a schematic diagram to show a general configuration of a motorcycle which is one example of an open-cabin vehicle according to a first embodiment.

FIG. 1 is a schematic view to show the configuration of an open-cabin vehicle (motorcycle) according to a first embodiment of the present teaching. Referring to FIG. 1, a motorcycle 100 is provided with a front fork 2 in a front part of the vehicle 1. A handle 4 is attached to an upper end of the front fork 2. A front wheel 3 is rotatably attached to a lower end of the front fork 2.

A seat 5 is disposed at an upper part of substantially center of the vehicle 1. A control apparatus 10 and a power supply apparatus 20 are disposed below the rear part of the seat 5. The control apparatus 10 controls the drive apparatus 30, and also controls elements other than the drive apparatus 30 in the motorcycle 100. The control apparatus 10 may include an ECU (Engine Control Unit: engine control apparatus). The ECU may be mounted on the vehicle 1 separately from the control apparatus 10. The power supply apparatus 20 is, for example, a battery. The drive apparatus (power unit) 30 is provided in a lower part of the vehicle 1. The drive apparatus 30 may be an engine or a motor. A rear wheel 8 is rotatably attached to a lower part at a rear end of the vehicle 1. The rear wheel 8 is rotated by power generated by the drive apparatus 30.

[Functional Block Diagram Around the Control Apparatus 10]

Figure 2:
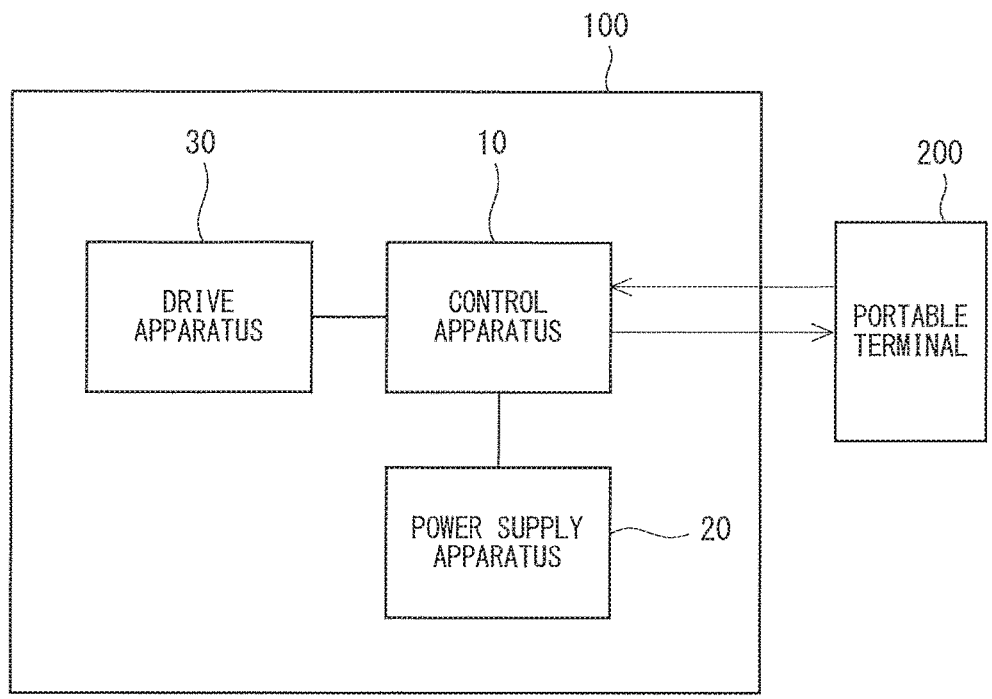
FIG. 2 is a functional block diagram of a control apparatus, a power supply apparatus, and a drive apparatus in FIG. 1.

FIG. 2 is a functional block diagram of the control apparatus 10, the power supply apparatus 20, and the drive apparatus 30 in FIG. 1. Referring to FIG. 2, the power supply apparatus 20 supplies power to the control apparatus 10. The control apparatus 10 receives supply of power from the power supply apparatus 20, and controls the drive apparatus 30. Specifically, the control apparatus 10 performs signal exchanges with the portable terminal 200 without any operation of the operator (rider) who carries the portable terminal 200 on the portable terminal 200 or the motorcycle 100 to activate the drive control unit 11 (to be described later) in the control apparatus 10 of the motorcycle 100, and the drive control unit 11 achieves a state in which the drive control unit 11 can control the drive apparatus 30 (controllable state). When operation of the motorcycle 100 is permitted to the operator who carries the portable terminal 200, the control apparatus 10 brings the drive apparatus 30 into a controllable state (for example, to activate an ECU). Here, the phrase "without any operation by the operator (rider), who carries the portable terminal 200, on the motorcycle 100 or the portable terminal 200" means "without the rider operating an operation button of a physical key (hard key) or a soft key (a key reconstructed by software in a display) of the portable terminal, or operating a physical key or a soft key of the motorcycle 100." Examples of the physical keys of the motorcycle include various operation switches (a main switch and ignition switch). Hereinafter, description will be continued with a rider as one example of the operator. Note that the operator may not be a rider, but may be a passenger who rides on the motorcycle 100 with the rider.

[Functional Block Diagram of Control Apparatus 10]

FIG. 1 shows a functional block diagram of the control apparatus 10. Referring to FIG. 1, the control apparatus 10 includes a drive control unit 11. The drive control unit 11 controls the drive apparatus 30. The drive control unit 11 is, for example, an ECU. As a result of the drive control unit 11 being activated, the drive apparatus 30 is brought into a controllable state. The controllable state means, for example, a state in which the drive apparatus 30 can be initiated.

The control apparatus 10 further includes an identification signal transmission unit 12. The identification signal transmission unit 12 intermittently transmits identification signal ID (for example a beacon) including identification information which is identifiable information to the outside of the motorcycle 100 without any operation by a rider, who carries the portable terminal 200, on the motorcycle 100 or the portable terminal 200. The phrase "without any operation by a rider, who carries the portable terminal 200, on the motorcycle 100 or the portable terminal 200" means "without the rider operating an operation button of a physical key (hard key) or a soft key (a key reconstructed by software in a display) of the portable terminal, or operating a physical key or a soft key of the motorcycle 100." Moreover, the identification information is a unique identification ID of the identification signal transmission unit 12, for example, UUID (Universally Unique IDentifier), UIID (Unique Installation IDentifier), SecureUDID (Unique Device IDentifier), or the like.

The term "intermittently" as used herein means that an identification signal ID may be transmitted always (continuously), or transmitted for every specific period. Further, the identification signal ID may be transmitted discontinuously or irregularly. Preferably, the identification signal transmission unit 12 transmits an identification signal ID always or for every specific period. The specific period is, for example, an interval of 10 to 5000 msec. The lower limit of the specific period is preferably 50 msec and more preferably 100 msec. The upper limit of the specific period is preferably 2000 msec, more preferably 1000 msec, and further preferably 800 msec, and even further preferably 700 msec. However, the specific period will not be limited to above described intervals, may be preset, or may be freely settable.

The control apparatus 10 further includes a response signal reception unit 13. The response signal reception unit 13 receives a response signal RE transmitted from the portable terminal 200 without any operation by a rider, who carries the portable terminal 200, on the motorcycle 100 or the portable terminal 200 in response to the identification signal ID. The phrase "without any operation by a rider, who carries the portable terminal 200, on the motorcycle 100 or the portable terminal 200" means "without the rider operating an operation button of a physical key (hard key) or a soft key (a key reconstructed by software in a display) of the portable terminal, or operating a physical key or a soft key of the motorcycle 100."

The control apparatus 10 further includes a request signal transmission unit 14. The request signal transmission unit 14 transmits, in response to reception of a response signal RE, a request signal CA for requesting the transmission of signal including key information KEY to the portable terminal 200 without any operation by a rider, who carries the portable terminal 200, on the motorcycle 100 or the portable terminal 200. The phrase "without any operation by a rider, who carries the portable terminal 200, on the motorcycle 100 or the portable terminal 200" means "without the rider operating an operation button of a physical key (hard key) or a soft key (a key reconstructed by software in a display) of the portable terminal, or operating a physical key or a soft key of the motorcycle 100."

Here, the key information KEY is a unique ID code. The portable terminal 200 prestores key information KEY corresponding to key information (ID code) stored in the drive-activation permission determination unit 16 in the storage unit 221 of the portable terminal 200.

The control apparatus 10 further includes a key-information signal reception unit 15. The key-information signal reception unit 15 receives the key information signal including the key information KEY transmitted from the portable terminal 200 without any operation by a rider, who carries the portable terminal 200, on the motorcycle 100 or the portable terminal 200.

The control apparatus 10 further includes a drive-activation permission determination unit 16. The drive-activation permission determination unit 16 determines, based on the key information KEY received by the key-information signal reception unit 15, whether or not to permit the activation of the drive control unit 11 without any operation by a rider, who carries the portable terminal 200, on the motorcycle 100 or the portable terminal 200. The phrase "without any operation by a rider, who carries the portable terminal 200, on the motorcycle 100 or the portable terminal 200" means "without the rider operating an operation button of a physical key (hard key) or a soft key (a key reconstructed by software in a display) of the portable terminal, or operating a physical key or a soft key of the motorcycle 100."

The control apparatus 10 further includes a drive activation control unit 17. The drive activation control unit 17 drives the drive control unit 11 without any operation by a rider, who carries the portable terminal 200, on the motorcycle 100 or the portable terminal 200. The phrase "without any operation by a rider, who carries the portable terminal 200, on the motorcycle 100 or the portable terminal 200" means "without the rider operating an operation button of a physical key (hard key) or a soft key (a key reconstructed by software in a display) of the portable terminal, or operating a physical key or a soft key of the motorcycle 100."

[Functional Block Diagram of Portable Terminal 200]

FIG. 1 shows a functional block diagram of the portable terminal 200. Referring to FIG. 1, the portable terminal 200 includes a storage unit 221, an identification signal reception unit 222, a response signal transmission unit 223, a request signal reception unit 224, and a key-information signal transmission unit 225.

The storage unit 221 stores the key information KEY corresponding to key information (ID code) stored in the drive-activation permission determination unit 16. The storage unit 221 further stores identification signal ID information for verifying the identification information within the identification signal ID transmitted from the identification signal transmission unit 12. The identification signal ID information is, for example, the same identification information as the identification information within the identification signal ID. For example, when the identification information within the identification signal ID is UUID, the identification signal ID information is the same UUID as the identification information.

The identification signal reception unit 222 receives intermittently transmitted identification signal ID, without any operation by a rider, who carries the portable terminal 200, on the motorcycle 100 or the portable terminal 200. Here, the phrase "without any operation by a rider, who carries the portable terminal 200, on the motorcycle 100 or the portable terminal 200" means "without the rider operating an operation button of a physical key (hard key) or a soft key (a key reconstructed by software in a display) of the portable terminal, or operating a physical key or a soft key of the motorcycle 100."

The response signal transmission unit 223 transmits, in response to the intermittently transmitted identification signal ID, a response signal RE without any operation by a user, who carries the portable terminal 200, on the motorcycle 100 or the portable terminal 200. Here, the phrase "without any operation by a rider, who carries the portable terminal 200, on the motorcycle 100 or the portable terminal 200" means "without the rider operating an operation button of a physical key (hard key) or a soft key (a key reconstructed by software in a display) of the portable terminal, or operating a physical key or a soft key of the motorcycle 100."

Note that in the response signal transmission unit 223, the identification information within the received identification signal ID is verified with the identification signal ID information within the storage unit 221 to determine whether or not to transmit a response signal RE. As a result of verification, if the identification information corresponds to the identification signal ID information, the response signal transmission unit 223 transmits a response signal RE. Here, the phrase "the identification information corresponds to the identification signal ID information" means, for example, that the identification information coincides with the identification signal ID information. On the other hand, as a result of the verification, if the identification information does not correspond to the identification signal ID information, the response signal transmission unit 223 does not transmit the response signal RE.

The request signal reception unit 224 receives request signal CA transmitted from the request signal transmission unit 14 without any operation by a rider, who carries the portable terminal 200, on the motorcycle 100 or the portable terminal 200. Here, the phrase "without any operation by a rider, who carries the portable terminal 200, on the motorcycle 100 or the portable terminal 200" means "without the rider operating an operation button of a physical key (hard key) or a soft key (a key reconstructed by software in a display) of the portable terminal, or operating a physical key or a soft key of the motorcycle 100."

The key-information signal transmission unit 225 transmits, in response to the request signal CA, a key information signal including key information KEY without any operation by a rider, who carries the portable terminal 200, on the motorcycle 100 or the portable terminal 200. Here, the phrase "without any operation by a rider, who carries the portable terminal 200, on the motorcycle 100 or the portable terminal 200" means "without the rider operating an operation button of a physical key (hard key) or a soft key (a key reconstructed by software in a display) of the portable terminal, or operating a physical key or a soft key of the motorcycle 100." The key information KEY is prestored in the storage unit 221 as described above.

[Hardware Configuration of Motorcycle 100 and Portable Terminal 200]

Figure 3:
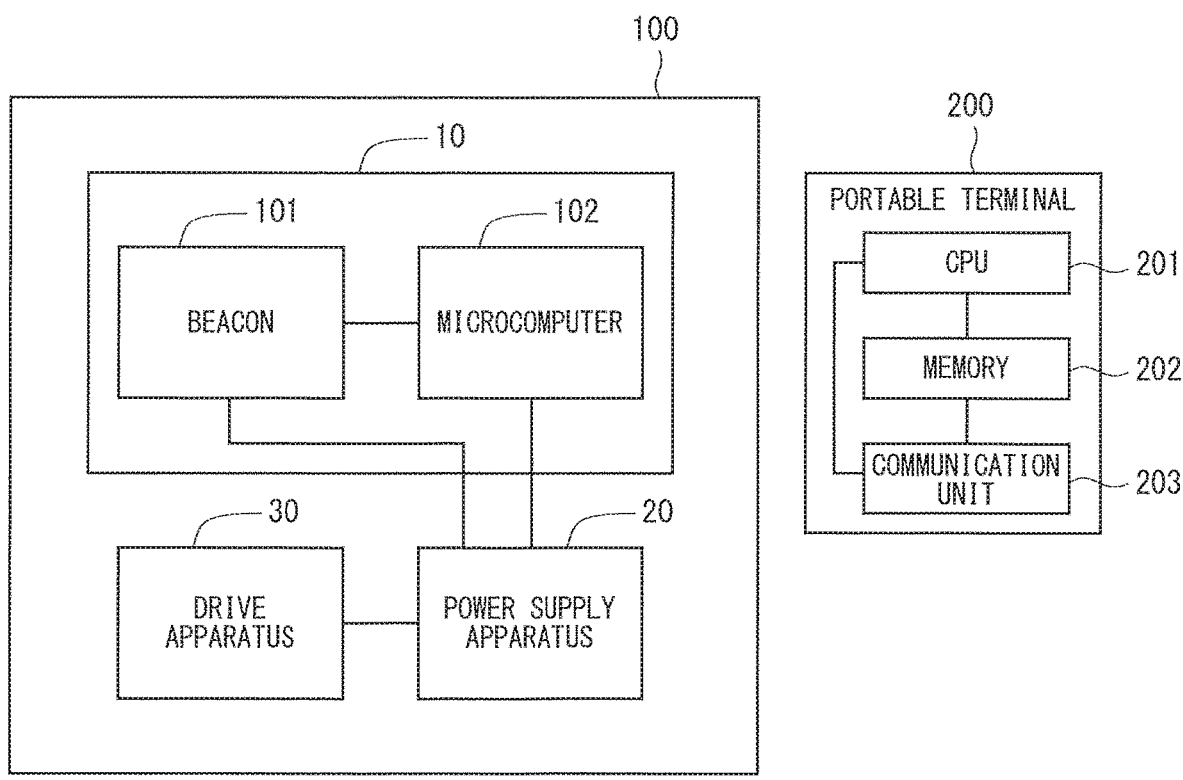
FIG. 3 is a functional block diagram to show one example of hardware configuration of the motorcycle and the portable terminal shown in FIGS. 1 and 2.

FIG. 3 is a functional block diagram to show one example of the hardware configuration of the motorcycle 100 and the portable terminal 200 shown in FIGS. 1 and 2. Referring to FIG. 3, the control apparatus 10 in the motorcycle 100 includes a beacon 101 and a microcomputer 102. The beacon 101 and the microcomputer 102 may be mounted on one chip. The beacon 101 may be mounted on a separate chip from that of the microcomputer 102. The beacon 101 corresponds to the identification signal transmission unit 12 in the functional block diagram of the control apparatus 10 in FIG. 1. The beacon 101 may receive power supply from the power supply apparatus 20, or a power supply apparatus such as a battery may be provided in the beacon 101.

Figure 4:
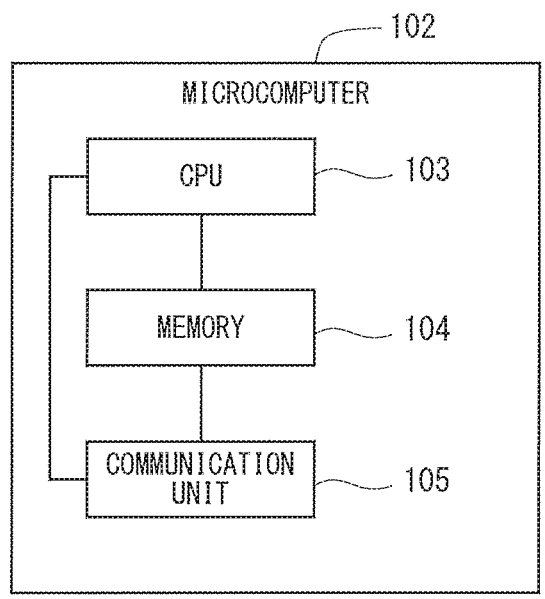
FIG. 4 is a functional block diagram of a microcomputer in FIG. 3.

FIG. 4 is a functional block diagram of the microcomputer 102 in FIG. 3. The microcomputer 102 includes a central processing unit (CPU) 103, a memory 104, and a communication unit 105. The CPU 103, the memory 104, and the communication unit 105 are connected with each other with a bus not shown. The memory 104 includes a RAM and a ROM, which are not shown. A vehicle response processing program stored in the ROM in the memory 104 is loaded on the RAM to be executed by the CPU 103 so that a drive control unit 11, a response signal reception unit 13, a request signal transmission unit 14, a key-information signal reception unit 15, a drive-activation permission determination unit 16, and a drive activation control unit 17 in FIG. 3 are implemented.

Referring to FIG. 3 again, the beacon 101 and the microcomputer 102 are connected with the power supply apparatus 20, and receive power supply from the power supply apparatus 20.

The portable terminal 200 includes a CPU 201, a memory 202, and a communication unit 203. The CPU 201, the memory 202, and the communication unit 203 are connected with each other with a bus not shown. The memory 202 includes a RAM and a ROM which are not shown. As a result of a portable-terminal response processing program stored in the memory 202 being loaded and executed by the CPU 201, the portable terminal 200 executes a portable terminal response processing to be described later. That is, the portable-terminal response processing program stored in the memory 202 is loaded and executed by the CPU 201 so that a storage unit 221, an identification signal reception unit 222, a response signal transmission unit 223, a request signal reception unit 224, and a key-information signal transmission unit 225 are implemented in the portable terminal 200.

[Overview of Drive-Control Unit Activation System]

Referring to FIG. 1, the identification signal transmission unit 12 of the control apparatus 10 intermittently transmits an identification signal ID. At this moment, the identification signal transmission unit 12 transmits the identification signal ID in every direction in a plan view of the motorcycle 100.

In the portable terminal 200 carried by a rider of the motorcycle 100, the portable-terminal response processing program which is prestored in the memory 202 is activated so that the storage unit 221, the identification signal reception unit 222, the response signal transmission unit 223, the request signal reception unit 224, and the key-information signal transmission unit 225 are implemented. Further, as described above, key information KEY unique to the motorcycle 100 is stored in the storage unit 221 (memory 202).

If a rider who carries the portable terminal 200 approaches the motorcycle 100, the identification signal reception unit 222 of the portable terminal 200 receives an identification signal ID within a reachable range of the identification signal ID. At this moment, the response signal transmission unit 223 of the portable terminal 200 transmits a response signal RE corresponding to the identification signal ID to the motorcycle 100.

The response signal reception unit 13 in the control apparatus 10 of the motorcycle 100 receives the response signal RE from the portable terminal 200. At this moment, in response to the response signal RE, the request signal transmission unit 14 of the control apparatus 10 of the motorcycle 100 transmits request signal CA for requesting the key information KEY in the portable terminal 200 to the portable terminal 200. The request signal reception unit 224 in the portable terminal 200 receives the request signal CA. Then, the key-information signal transmission unit 225 in the portable terminal 200 transmits, in response to the request signal CA, a key information signal including the key information KEY to the motorcycle 100.

The key-information signal reception unit 15 in the control apparatus 10 of the motorcycle 100 receives a key information signal. Then, the drive-activation permission determination unit 16 determines, based on the key information KEY, whether or not to permit the supply of power from the power supply apparatus 20 to the drive control unit 11. The drive-activation permission determination unit 16 of the control apparatus 10 of the motorcycle 100 determines, for example, whether or not the key information KEY0 stored in the memory 104, which is its own storage unit, coincides with the key information KEY transmitted from the portable terminal 200. When the key information KEY0 coincides with the key information KEY, the drive-activation permission determination unit 16 permits supply of power to the drive control unit 11. In this case, the drive activation control unit 17 in the control apparatus 10 activates the drive control unit 11. Specifically, the drive activation control unit 17 supplies power from the power supply apparatus 20 to the drive control unit 11 and activates the drive control unit 11 to bring the drive apparatus 30 into a controllable state. On the other hand, when the key information KEY0 does not coincide with the key information KEY, the drive-activation permission determination unit 16 does not permit supply of power to the drive control unit 11. In this case, the drive activation control unit 17 maintains supply of power from the power supply apparatus 20 to the drive control unit 11 being shut down. Therefore, the drive control unit 11 will not be activated.

The above described series of interactions between the motorcycle 100 and the portable terminal 200 are executed without any operation by a rider on the motorcycle 100 or the portable terminal 200. The phrase, "without any operation by a rider, who carries the portable terminal 200, on the motorcycle 100 or the portable terminal 200" means "without the rider operating an operation button of a physical key (hard key) or a soft key (a key reconstructed by software in a display) of the portable terminal, or operating a physical key or a soft key of the motorcycle 100."

In the case of a automobile having a door, the driver performs operations such as opening the door, taking a seat, and fastening the seat belt. In the case of an automobile, multiple operations are performed until bringing the vehicle into a controllable state (a state in which the drive apparatus such as an engine is ready to be initiated). Therefore, among these multiple operations, operating a physical key and operating the portable terminal 200 will not cause the operator to feel so much stress.

On the other hand, the rider of the motorcycle 100 approaches the motorcycle 100 after wearing a suit for driving. Then, after the rider sits on the seat 5 of the motorcycle 100, there are few operations to be performed by the rider until a controllable state (a state in which the drive apparatus 30 is ready to be initiated) is achieved. For that reason, if it becomes necessary to operate a physical key or a soft key such as an operation switch represented by a main switch of the motorcycle 100 one or more times before achieving a controllable state, or to take out the portable terminal 200 from the suit and operate it, convenience deteriorates and the rider tends to feel stress from these operations.

In the present embodiment, if the rider takes action to approach the motorcycle 100 without performing certain operation, it becomes possible to bring the drive apparatus 30 into a state of being ready to be initiated (controllable state) without any operation by a rider, who carries the portable terminal 200, on the motorcycle 100 or the portable terminal 200. Therefore, there is no need of performing the above described excessive operations, thus further improving convenience.

Hereinafter, operational flow of the above described drive-control unit activation system will be described in detail.

[Processing Action of Drive-Control Unit Activation System]

The drive-control unit activation system according to the present teaching includes a beacon transmitting processing for intermittently transmitting an identification signal ID, an action processing (portable terminal response processing) of the portable terminal 200 in response to the identification signal ID, and an action processing (vehicle response processing) of the motorcycle 100 in response to the action processing of the portable terminal. The beacon transmitting processing and the vehicle response processing are performed by the control apparatus 10 in the motorcycle 100. The portable terminal response processing is performed by the portable terminal 200.

Figure 5:
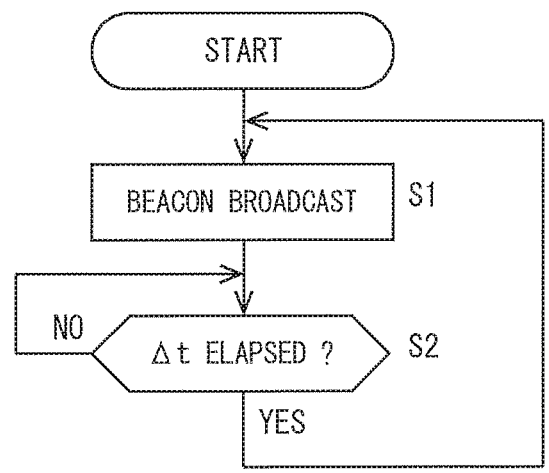
FIG. 5 is an operational flow diagram of beacon transmitting processing.

FIG. 5 is an operational flow diagram of the beacon transmitting processing. Referring to FIG. 5, the identification signal transmission unit 12 in the control apparatus 10 transmits an identification signal ID at every elapse of time period Δt (YES in S2) in every direction in a plan view of the motorcycle 100 (51). The time period Δt may be preset or may be adjustable.

Figure 6:
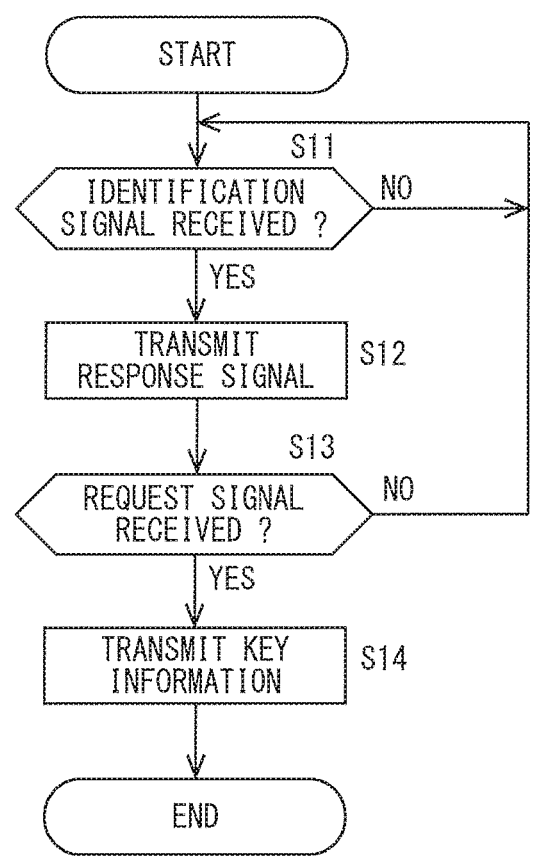
FIG. 6 is an operational flow diagram of a portable terminal response processing.
Figure 7:
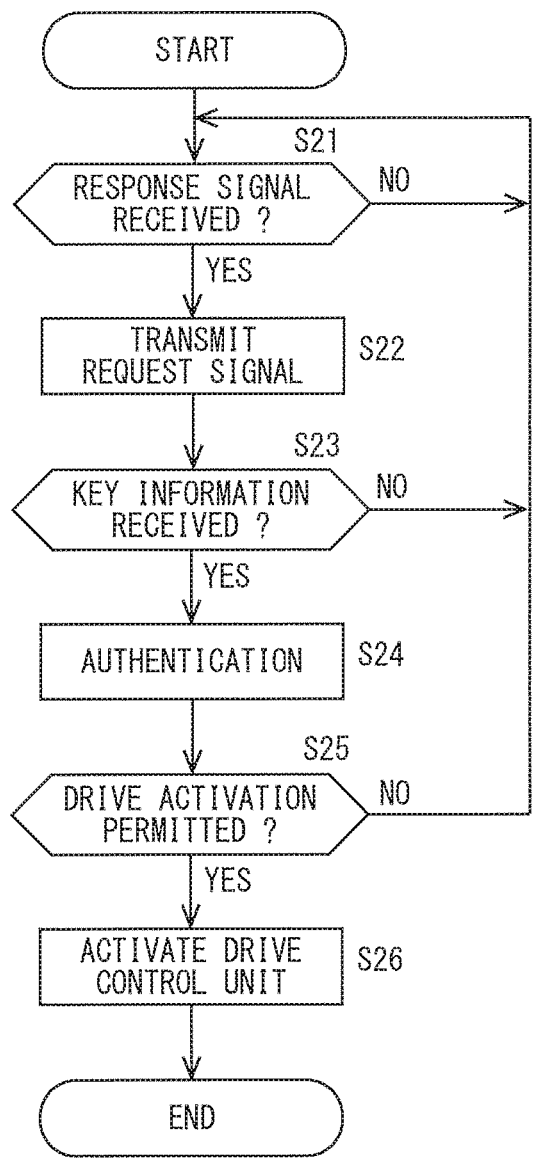
FIG. 7 is an operational flow diagram of a vehicle response processing.

FIG. 6 is an operational flow diagram of the portable terminal response processing performed by the portable terminal 200, and FIG. 7 is an operational flow diagram of the vehicle response processing performed by the motorcycle 100. Referring to FIGS. 6 and 7, the identification signal reception unit 222 of the portable terminal 200 receives the identification signal ID transmitted from the identification signal transmission unit 12 (S11). At this moment, the identification signal reception unit 222 of the portable terminal 200 receives the identification signal ID without any operation of a rider, who carries the portable terminal 200, on the motorcycle 100 or the portable terminal 200. Upon reception of the identification signal ID, the response signal transmission unit 223 of the portable terminal 200 transmits the response signal RE to the motorcycle 100 without any operation of a rider, who carries the portable terminal 200, on the motorcycle 100 or the portable terminal 200 (S12). Note that the response signal transmission unit 223 verifies, before transmitting the response signal RE, the identification information in the received identification signal ID with the identification signal ID information in the storage unit 221, and determines whether or not to transmit the response signal RE. As described above, in the portable terminal 200, the portable-terminal response processing program which is prestored in the memory 202 is operating. The portable terminal 200 further stores, in the storage unit 221, information regarding identification information (identification signal ID information) unique to the identification signal transmission unit 12 in the control apparatus 10 of the motorcycle 100. As a result of verification, if the identification information corresponds to the identification signal ID information, the response signal transmission unit 223 transmits the response signal RE. Here, the phrase "the identification information corresponds to the identification signal ID information" means for example that the identification information coincides with the identification signal ID information. On the other hand, as a result of verification, when the identification information does not correspond to the identification signal ID information, the response signal transmission unit 223 does not transmit the response signal RE.

The response signal reception unit 13 in the control apparatus 10 of the motorcycle 100 receives the response signal RE from the portable terminal 200 without any operation of a rider on the motorcycle 100 or the portable terminal 200 (YES in S21). In response to reception of the response signal RE by the response signal reception unit 13, the request signal transmission unit 14 transmits the request signal CA for requesting the portable terminal 200 to transmit the key information signal including key information KEY without any operation of a rider on the motorcycle 100 or the portable terminal 200 (S22).

The request signal reception unit 224 in the portable terminal 200 receives the request signal CA without any operation by a rider on the motorcycle 100 or the portable terminal 200 (YES in S13). The key-information signal transmission unit 225 in the portable terminal 200 transmits, in response to the received request signal CA, the key information signal including the key information KEY prestored in the storage unit 221 to the motorcycle 100 without any operation by the rider on the motorcycle 100 or the portable terminal 200 (S14).

The key-information signal reception unit 15 in the control apparatus 10 of the motorcycle 100 receives a signal including the key information KEY without any operation by the rider on the motorcycle 100 or the portable terminal 200 (YES in S23). At this moment, the drive-activation permission determination unit 16 in the control apparatus 10 performs authentication processing (S24).

In the authentication processing, the drive-activation permission determination unit 16 determines, based on the key information KEY received in step S23, whether or not to permit activation of the drive control unit 11 without any operation by the rider, who carries the portable terminal 200, on the motorcycle 100 or the portable terminal 200 (S25). The determination method is not particularly limited. For example, the authentication processing performed by the drive-activation permission determination unit 16 may be immobilizer authentication or another well-known authentication method. As one example, as described above, the drive-activation permission determination unit 16 of the control apparatus 10 determines whether or not the key information KEY0 stored in the memory 104 coincides with the key information KEY transmitted from the portable terminal 200.

When the key information KEY cannot be authenticated (NO in S25), the vehicle response processing action of the control apparatus 10 returns to step S21. That is, the vehicle response processing is retried. In this case, the drive activation control unit 17 does not activate the drive control unit 11. That is, the drive activation control unit 17 maintains supply of power from the power supply apparatus 20 to the drive control unit 11 being shut down without any operation by a rider, who carries the portable terminal 200, on the motorcycle 100 or the portable terminal 200. On the other hand, when the key information KEY can be authenticated, the drive-activation permission determination unit 16 permits activation of the drive control unit 11 (YES in S25). At this moment, the drive activation control unit 17 activates the drive control unit 11 without any operation by the rider, who carries the portable terminal 200, on the motorcycle 100 or the portable terminal 200 (S26). Specifically, the drive activation control unit 17 supplies power from the power supply apparatus 20 to the drive control unit 11. As a result of this, the drive control unit 11 is brought into a state of being ready to initiate the drive apparatus 30 (controllable state).

After the controllable state is achieved, the rider arrives at the motorcycle 100. For that reason, after taking the seat 5, the rider can quickly initiate the drive apparatus 30, for example, by pressing the main switch, which is not shown, of the motorcycle 100. Note that the handle lock may be unlocked at the same time as the initiation of the drive apparatus 30.

As described so far, in the drive-control unit activation system in a first embodiment, it is made possible to bring the drive apparatus 30 into a state of being ready to be controlled (that is, a controllable state) by a rider taking action to approach the motorcycle 100 without performing certain operation, without any operation of the rider on the motorcycle 100 or the portable terminal 200. Therefore, there is no need of performing the above described excessive operations, and thus convenience is further improved.

Second Embodiment

Figure 8:
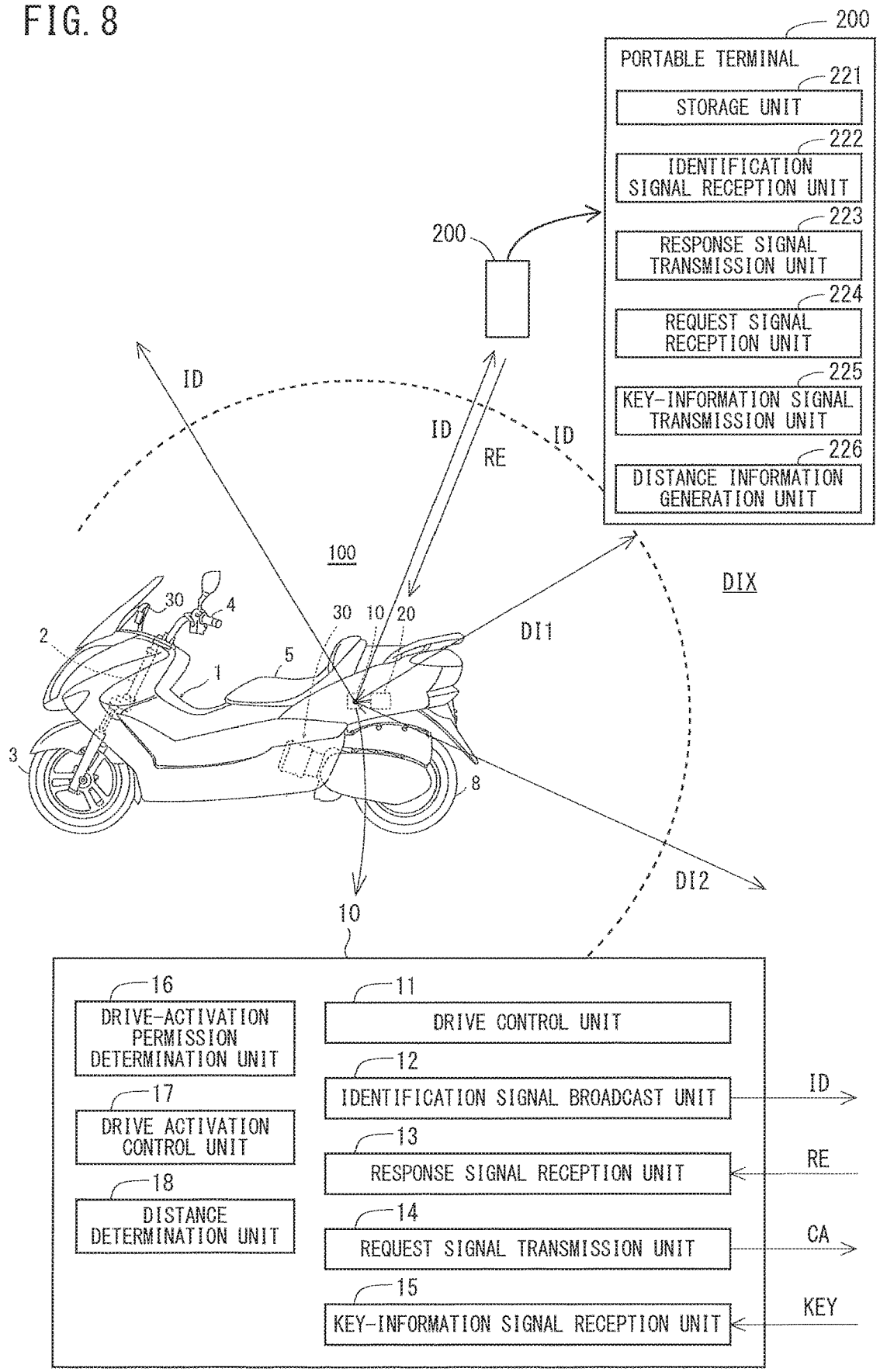
FIG. 8 is a schematic view to show a general configuration of a motorcycle which is one example of an open-cabin vehicle according to a second embodiment.

FIG. 8 is a schematic view of a control apparatus 10 according to a second embodiment. Referring to FIG. 8, the control apparatus 10 shown in FIG. 8 newly includes a distance determination unit 18 compared with the control apparatus 10 shown in FIG. 1. Moreover, the portable terminal 200 shown in FIG. 8 newly includes a distance information generation unit 226, compared with the portable terminal 200 shown in FIG. 1.

In the present embodiment, the identification signal transmission unit 12 intermittently transmits an identification signal ID. This identification signal includes information (signal strength information) regarding the signal strength of the identification signal ID transmitted from (the identification signal transmission unit 12 of) the control apparatus 10.

Upon receiving the identification signal ID, the distance information generation unit 226 of the portable terminal 200 generates information (distance information) regarding the distance between the identification signal transmission unit 12 and the portable terminal 200, based on the signal strength information. Then, the response signal transmission unit 223 transmits the response signal RE with the distance information being included therein. Here, the distance information is, for example, RSSI (Received Signal Strength Indicator) which is the signal strength of the identification signal ID at the portable terminal that has received the identification signal ID. The distance information may be a proximity which is determined based on the signal strength information and RSSI.

The proximity is a scale of distance obtained by dividing the distance between the portable terminal 200 and the motorcycle 100 into multiple steps. When the distance obtained based on the signal strength information and RSSI is within a specific distance DI1, the proximity, which is distance information, is supposed to be "DI1". When the distance obtained based on the signal strength information and RSSI is larger than DI1, the proximity which is distance information is supposed to be "DI2". Although, in the present example, the proximity was divided into two regions (DI1, DI2) according to distance, the proximity may be divided into three or more regions. The number of divisions of proximity will not be particularly limited. In the description below, explanation will be made supposing that distance information is proximity.

The response signal reception unit 13 receives the response signal RE including distance information regarding the distance between the portable terminal 200 and the motorcycle 100 without any operation by a rider, who carries the portable terminal 200, on the motorcycle 100 or the portable terminal 200.

The distance determination unit 18 determines whether or not the distance between the portable terminal 200 and the motorcycle 100 is within a specific distance DI1 based on the response signal RE without any operation by a rider, who carries the portable terminal 200, on the motorcycle 100 or the portable terminal 200. The phrase "without any operation by a rider, who carries the portable terminal 200, on the motorcycle 100 or the portable terminal 200" means "without the rider operating an operation button of a physical key (hard key) or a soft key (a key reconstructed by software in a display) of the portable terminal 200, or operating a physical key or a soft key of the motorcycle 100." Further, the specific distance DI1 is a preset distance. The specific distance DI1 may be adjustable by the rider who owns the portable terminal 200.

When the distance determination unit 18 determines that the distance between the portable terminal 200 and the motorcycle 100 is within the preset specific distance DI1, the request signal transmission unit 14 transmits request signal CA for requesting the key information KEY of the signal including key information to the portable terminal 200 without any operation by a rider, who carries the portable terminal 200, on the motorcycle 100 or the portable terminal 200. The actions thereafter are the same as those of the first embodiment.

According to the operations as described so far, if a rider who carries the portable terminal 200 approaches the motorcycle 100 within the specific distance DI1, it is possible to bring the drive apparatus 30 into a state of being ready to be controlled (that is, a controllable state) without any operation by the rider on the motorcycle 100 or the portable terminal 200. In this case, when the rider who carries the portable terminal 200 is located at a position farther than the specific distance DI1 from the motorcycle 100, even if the portable terminal 200 transmits a response signal RE in response to the identification signal ID, the control apparatus 10 will not transmit the request signal CA to the portable terminal 200. That is, determination of whether or not to permit the activation of the drive control unit 11 will not be performed. Therefore, after the rider who carries the portable terminal 200 approaches the motorcycle 100 to some extent, the drive control unit 11 can be activated. As a result, it is possible to inhibit a third party from getting on the motorcycle 100, which has been brought into a controllable state, and performing unlocking of the handle lock and/or initiation of the drive apparatus 30 before the rider arrives at the motorcycle 100.

Hereinafter, processing action of the drive-control unit activation system in the second embodiment will be described in detail.

[Processing Action of Drive-Control Unit Activation System]

Figure 9:
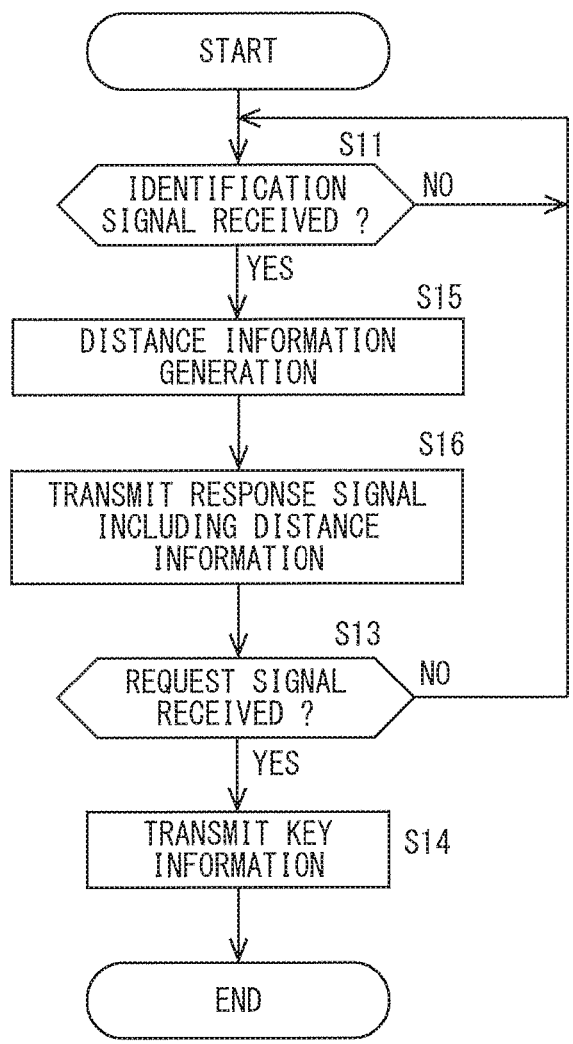
FIG. 9 is an operational flow diagram of a portable terminal response processing according to the second embodiment.
Figure 10:
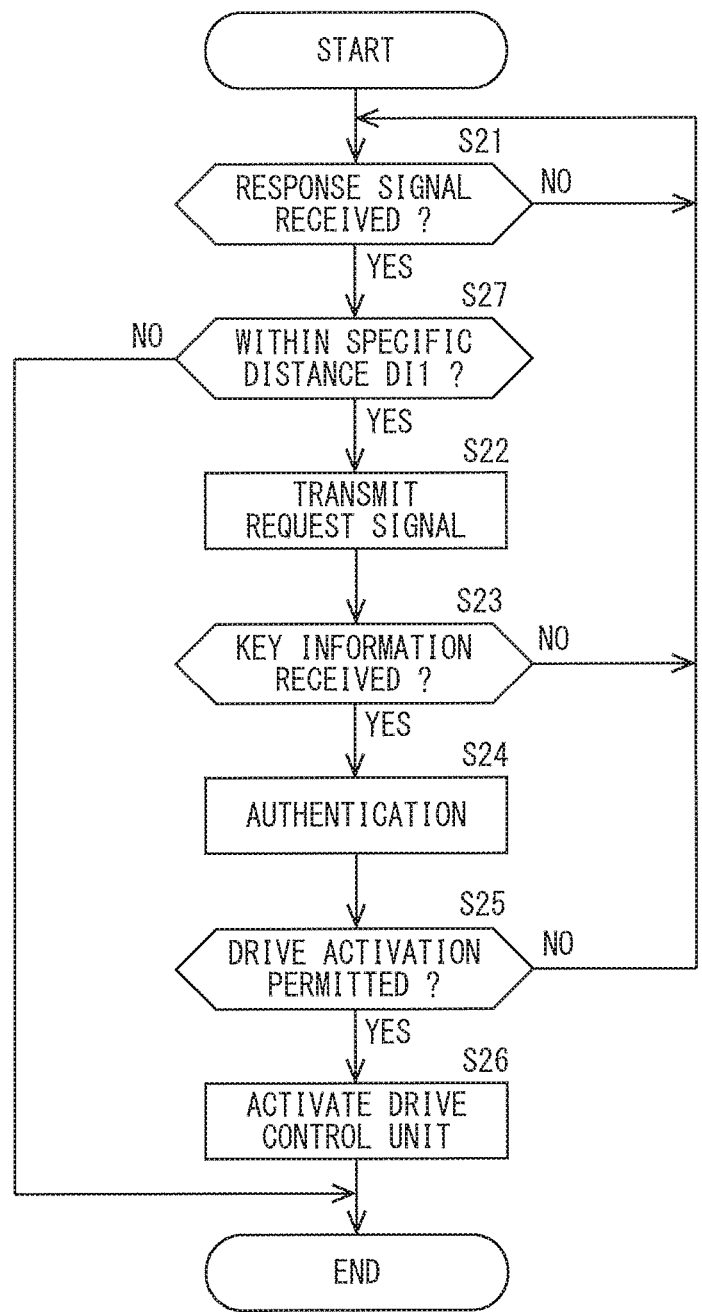
FIG. 10 is an operational flow diagram of a vehicle response processing according to the second embodiment.

FIG. 9 is an operational flow diagram of a portable terminal response processing in a second embodiment, and FIG. 10 is an operational flow diagram of a vehicle response processing in the second embodiment. Referring to FIGS. 9 and 10, as described above, the identification signal transmission unit 12 includes distance information in the identification signal ID in the present embodiment.

When the portable terminal 200 receives the identification signal ID (S11), the distance information generation unit 226 of the portable terminal 200 generates distance information included in the identification signal ID without any operation by the rider on the motorcycle 100 or the portable terminal 200 (S15). In the present example, the distance information will be explained as proximity as described above. When the identification signal reception unit 222 receives the identification signal ID, the distance information generation unit 226 obtains RSSI which is received signal strength of the received identification signal ID. Next, the distance information generation unit 226 obtains proximity based on the signal strength information included in the identification signal ID, and RSSI. Suppose that the portable terminal 200 which received the identification signal ID is located at a distance DIX, which is farther than the specific distance DI1. In this case, the distance information generation unit 226 determines that the portable terminal 200 is located farther than the specific distance DI1 based on the signal strength information and the obtained RSSI, and decides the proximity, which is distance information, to be "DI2".

After the distance information generation unit 226 generates distance information, the response signal transmission unit 223 transmits the response signal RE to the motorcycle 100 without any operation by the rider, who carries the portable terminal 200, on the motorcycle 100 or the portable terminal 200 (S16). At this moment, the portable terminal 200 transmits the response signal RE with the distance information generated in step S15 included therein.

The response signal reception unit 13 of the control apparatus 10 receives the response signal RE including the distance information without any operation by a rider, who carries the portable terminal 200, on the motorcycle 100 or the portable terminal 200 (S21). At this moment, the distance determination unit 18 determines, based on the distance information in the received response signal RE, whether or not the distance between the portable terminal 200 and the motorcycle 100 is within the specific distance DI1 without any operation by a rider, who carries the portable terminal 200, on the motorcycle 100 or the portable terminal 200 (S27).

As a result of determination, since the distance between the portable terminal 200 and the motorcycle 100 is farther than within the specific distance DI1 (NO in S27), the control apparatus 10 ends the operational flow of the vehicle response processing. That is, in this case, the drive activation control unit 17 does not supply power from the power supply apparatus 20 to the drive control unit 11, and does not activate the drive control unit 11.

On the other hand, suppose that as a result of the rider who carries the portable terminal 200 further decreasing the distance to the motorcycle 100, the portable terminal 200 has become located within the specific distance DI1. In this case, after the identification signal reception unit 222 of the portable terminal 200 receives the identification signal ID without any operation by the rider, who carries the portable terminal 200, on the motorcycle 100 or the portable terminal 200 (S11), the distance information generation unit 226 generates the distance information without any operation by the rider, who carries the portable terminal 200, on the motorcycle 100 or the portable terminal 200 (S15). At this moment, the portable terminal 200 determines that the portable terminal 200 is located within the specific distance DI1 based on the signal strength information included in the identification signal ID and generated RSSI, and the proximity which is distance information is decided to be "DI1".

Next, the response signal transmission unit 223 of the portable terminal 200 transmits the response signal RE to the motorcycle 100 without any operation by the rider, who carries the portable terminal 200 (S16), on the motorcycle 100 or the portable terminal 200. At this moment, the portable terminal 200 transmits the response signal RE with the distance information generated in step S15 included therein.

The response signal reception unit 13 of the control apparatus 10 receives the response signal RE including the distance information without any operation by a rider, who carries the portable terminal 200, on the motorcycle 100 or the portable terminal 200 (S21). Then, the distance determination unit 18 determines, based on the distance information in the received response signal RE, whether or not the distance between the portable terminal 200 and the motorcycle 100 is within the specific distance DI1 without any operation by a rider, who carries the portable terminal 200, on the motorcycle 100 or the portable terminal 200 (S27).

At this moment, since the proximity which is distance information is DI1, it is determined that the distance between the portable terminal 200 and the motorcycle 100 is within the specific distance DI1 (YES in S27). In this case, the request signal transmission unit 14 transmits the request signal CA (S22). The actions thereafter are the same as those of the first embodiment.

Specifically, the request signal reception unit 224 of the portable terminal 200 receives the request signal CA without any operation by the rider, who carries the portable terminal 200, on the motorcycle 100 or the portable terminal 200 (YES in S13). Then, the key-information signal transmission unit 225 transmits the key information signal including the key information KEY without any operation by the rider, who carries the portable terminal 200, on the motorcycle 100 or the portable terminal 200 (S14).

The key-information signal reception unit 15 of the control apparatus 10 of the motorcycle 100 receives the key information signal without any operation by the rider, who carries the portable terminal 200, on the motorcycle 100 or the portable terminal 200 (YES in S23). Then, the drive-activation permission determination unit 16 determines, based on the key information KEY received in step S23, whether or not to permit activation of the drive control unit 11 without any operation by the rider, who carries the portable terminal 200, on the motorcycle 100 or the portable terminal 200 (S25). When the key information KEY cannot be authenticated (NO in S25), the vehicle response processing action of the control apparatus 10 returns to step S21. That is, the vehicle response processing is retried. In this case, the drive activation control unit 17 does not activate the drive control unit 11. That is, the drive activation control unit 17 maintains supply of power from the power supply apparatus 20 to the drive control unit 11 being shut down without any operation by the rider, who carries the portable terminal 200, on the motorcycle 100 or the portable terminal 200. On the other hand, when the key information KEY can be authenticated, the drive-activation permission determination unit 16 permits activation of the drive control unit 11 (YES in S25). At this moment, the drive activation control unit 17 activates the drive control unit 11 without any operation by the rider, who carries the portable terminal 200, on the motorcycle 100 or the portable terminal 200 (S26). Specifically, the drive activation control unit 17 supplies power from the power supply apparatus 20 to the drive control unit 11. As a result of this, the drive control unit 11 is brought into a state of being ready to initiate the drive apparatus 30 (controllable state).

In the case of the second embodiment, the control apparatus 10 starts determination of whether or not to permit activation of the drive control unit 11 according to the distance from the rider who carries the portable terminal 200 to the motorcycle 100. Therefore, after the rider who carries the portable terminal 200 approaches the motorcycle 100 to some extent, the drive control unit 11 can be activated. As a result, it becomes possible to inhibit a third party from getting on the motorcycle 100 to perform unlocking of the handle lock and/or initiation of the engine before the rider arrives at the motorcycle 100.

The above described specific distance can be appropriately decided based on the distance (for example, a distance which makes it easy to inhibit the motorcycle 100 from being operated by a third party) according to the kind, size, etc. of the open-cabin vehicle represented by the motorcycle 100, and the capacity of the power supply apparatus 20 equipped on the open-cabin vehicle, or the condition of time at which complaint from the operator represented by the rider is less likely to arise. A person of ordinary skill in the art can appropriately design the above described specific distance.

In the above description, the distance information has been explained as proximity. However, the distance information will not be limited to the above described proximity. For example, the portable terminal 200 may transmit RSSI in place of proximity as the distance information. In this case, the distance determination unit 18 in the control apparatus 10 obtains, for example, a proximity based on the signal strength information and RSSI. Then, based on the obtained proximity, determination is made on whether or not the position of the portable terminal 200 is within the specific distance DI1.

So far, embodiments of the present teaching have been described. However, the above described embodiments are merely exemplification for practicing the present teaching. Therefore, the present teaching will not be limited to the above described embodiments, and can be practiced by appropriately modifying them within a range not departing from the spirit of the teaching.

The location for disposing the control apparatus 10 will not be limited to the location shown in FIG. 1. The position of the control apparatus 10 will not be particularly limited provided that the control apparatus 10 is equipped on the open-cabin vehicle represented by the motorcycle 100.

Moreover, information regarding the key information KEY and the identification signal ID in the portable terminal 200 can be downloaded to the portable terminal 200 via a server. Therefore, for example, when an operator represented by a rider has lost the portable terminal 200, or has lent the motorcycle 100 to his/her friend etc., it is possible to execute the above described drive-control unit activation system by downloading information regarding the key information KEY and the identification signal ID to another portable terminal which is different from the portable terminal 200.

In the above described embodiments, after the controllable state is achieved, unlocking of the handle lock and initiation of the drive apparatus are supposed to be simultaneous. However, after the controllable state is achieved, it is also possible to perform the unlocking of a handle lock and initiation of the drive apparatus at different timings. For example, it may be configured such that pressing a main switch once results in unlocking of the handle lock, and pressing the main switch once more results in initiation of the drive apparatus.

In the above described embodiments, explanation has been made such that the portable-terminal response processing program is activated in advance in the portable terminal 200. However, the portable-terminal response processing program may be activated when the portable terminal 200 receives the identification signal ID.

In the above described embodiments, the identification signal transmission unit 12 may receive supply of power from the power supply apparatus 20, or a power supply apparatus such as a battery may be provided in the beacon 101.

In the above described embodiments, the identification signal transmission unit 12 may always transmit an identification signal intermittently until the power supply is used up. Moreover, the identification signal transmission unit 12 may temporarily stop the transmitting of the identification signal according to the operation by the rider. Further, the motorcycle 100 includes an infrared sensor, and while a human is being detected by the infrared sensor, the identification signal transmission unit 12 may intermittently transmit an identification signal.

REFERENCE SIGNS LIST

10 Control apparatus
11 Drive control unit
12 Identification signal transmission unit
13 Response signal reception unit
14 Request signal transmission unit
15 Key-information signal reception unit
16 Drive-activation permission determination unit
17 Drive activation control unit
18 Distance determination unit
20 Power supply apparatus
30 Drive apparatus
100 Motorcycle
200 Portable terminal

What is claimed is:

1. An open-cabin vehicle having a riding area that is not an enclosed space, comprising:
    a drive apparatus;
    a control apparatus configured to control the drive apparatus; and
    a power supply apparatus configured to supply power to the control apparatus, wherein
    the control apparatus comprises:
        a drive control unit configured to control the drive apparatus;
        an identification signal transmission unit which is a beacon and configured to intermittently transmit an identification signal including identification information which is identifiable information, without any operation on the open-cabin vehicle or on a portable terminal including key information, the portable terminal being configured to transmit a response signal in response to the identification signal that is intermittently transmitted;
        a response signal reception unit configured to receive the response signal transmitted from the portable terminal in response to the identification signal which has been intermittently transmitted;
        a request signal transmission unit configured to transmit, in response to reception of the response signal, a request signal for requesting the portable terminal to transmit a key information signal including the key information;
        a key-information signal reception unit configured to receive the key information signal including the key information transmitted from the portable terminal in response to the request signal by the request signal transmission unit;
        a drive-activation permission determination unit configured to determine, based on the key information signal received by the key-information signal reception unit, whether or not to permit activation of the drive control unit; and
        a drive activation control unit configured to activate the drive control unit in response to the drive-activation permission determination unit permitting activation of the drive control unit,
    wherein the control apparatus is configured such that the identification signal transmission unit intermittently transmits the identification signal without any operation on the open-cabin vehicle or on the portable terminal, and the drive control unit is activated without any operation on the open-cabin vehicle or on the portable terminal;
    wherein the response signal further includes distance information regarding a distance between the portable terminal and the open-cabin vehicle,
    wherein the control apparatus further includes a distance determination unit configured to determine, based on the response signal including the distance information, whether or not the distance between the portable terminal and the open-cabin vehicle is within a specific distance,
    wherein the request signal transmission unit is configured to transmit the request signal for requesting the portable terminal to transmit the key information signal including the key information in response to the distance determination unit determining that the distance between the portable terminal and the open-cabin vehicle is within the specific distance based on the distance information, and
    wherein
    the identification signal includes signal strength information that is information regarding the signal strength of the identification signal transmitted from the identification signal transmission unit, and
    the distance information is RSSI (Received Signal Strength Indicator) which is the signal strength of the identification signal at the portable terminal that has received the identification signal or a proximity which is determined based on the signal strength information and RSSI.

2. The open-cabin vehicle according to claim 1, wherein the drive apparatus includes an engine or a motor.

3. The open-cabin vehicle according to claim 1, wherein the open-cabin vehicle further includes a front wheel and a rear wheel, and
the rear wheel is rotated by power generated by the drive apparatus.

4. A portable terminal for communication with an open-cabin vehicle having a riding area is not an enclosed space, the portable terminal having key information, wherein the open-cabin vehicle includes:
a drive apparatus;
a control apparatus configured to control the drive apparatus, the control apparatus including:
  a drive control unit configured to control the drive apparatus;
  an identification signal transmission unit which is a beacon and configured to intermittently transmit an identification signal including identification information which is identifiable information, without any operation on the open-cabin vehicle or the portable terminal;
  a response signal reception unit configured to receive a response signal transmitted from the portable terminal including the key information;
  a request signal transmission unit configured to transmit, in response to reception of the response signal, a request signal for requesting the portable terminal to transmit a key information signal including the key information;
  a key-information signal reception unit configured to receive the key information signal including the key information transmitted from the portable terminal;
  a drive-activation permission determination unit configured to determine, based on the key information signal received by the key-information signal reception unit, whether or not to permit activation of the drive control unit; and
  a drive activation control unit configured to activate the drive control unit in response to the drive-activation permission determination unit permitting activation of the drive control unit; and
a power supply apparatus configured to supply power to the control apparatus,
wherein the control apparatus is configured such that the identification signal transmission unit intermittently transmits the identification signal without any operation on the open-cabin vehicle or on the portable terminal, and the drive control unit is activated without any operation on the open-cabin vehicle or on the portable terminal,
the portable terminal comprising:
a storage unit for storing the key information;
a response signal transmission unit configured to transmit, in response to the identification signal which has been intermittently transmitted, the response signal without any operation on the open-cabin vehicle or the portable terminal; and
a key-information signal transmission unit configured to transmit, in response to the request signal by the request signal transmission unit, the key information signal including the key information without any operation on the open-cabin vehicle or the portable terminal;
wherein the response signal further includes distance information regarding a distance between the portable terminal and the open-cabin vehicle,
wherein the control apparatus of the open-cabin vehicle further includes a distance determination unit configured to determine, based on the response signal including the distance information, whether or not the distance between the portable terminal and the open-cabin vehicle is within a specific distance, without any operation on the open-cabin vehicle or the portable terminal, and
wherein the request signal transmission unit is configured to transmit the request signal for requesting the portable terminal to transmit the key information signal including the key information in response to the distance determination unit determining, based on the distance information, that the distance between the portable terminal and the open-cabin vehicle is within the specific distance,
the portable terminal further comprising
a distance information generation unit configured to generate the distance information regarding the distance between the portable terminal and the open-cabin vehicle in response to reception of the identification signal, wherein
the response signal transmission unit of the portable terminal is configured to transmit the response signal including the distance information without any operation on the open-cabin vehicle or the portable terminal, and
wherein
the identification signal includes signal strength information that is information regarding the signal strength of the identification signal transmitted from the identification signal transmission unit, and
the distance information is RSSI (Received Signal Strength Indicator) which is the signal strength of the identification signal at the portable terminal that has received the identification signal or a proximity which is determined based on the signal strength information and RSSI.

5. The portable terminal according to claim 4, wherein the drive apparatus includes an engine or a motor.

6. The portable terminal according to claim 4, wherein the open-cabin vehicle further includes a front wheel and a rear wheel, and
the rear wheel is rotated by power generated by the drive apparatus.

* * * * *